(12) United States Patent
Schrock

(10) Patent No.: US 7,801,154 B2
(45) Date of Patent: Sep. 21, 2010

(54) SYSTEM AND METHOD FOR AUTOMATED ACCESS OF A DATA MANAGEMENT SERVER THROUGH A VIRTUAL PRIVATE NETWORK

(75) Inventor: Brian Schrock, Dublin, OH (US)

(73) Assignee: The Cobalt Group, Inc., Seattle, WA (US)

( * ) Notice: Subject to any disclaimer, the term of this patent is extended or adjusted under 35 U.S.C. 154(b) by 544 days.

(21) Appl. No.: 11/716,849

(22) Filed: Mar. 12, 2007

(65) Prior Publication Data

US 2007/0211739 A1  Sep. 13, 2007

Related U.S. Application Data

(60) Provisional application No. 60/781,117, filed on Mar. 10, 2006.

(51) Int. Cl.
*G06F 9/455* (2006.01)

(52) U.S. Cl. ............................. 370/395.53; 370/395.2; 718/1

(58) Field of Classification Search ........................ None
See application file for complete search history.

(56) References Cited

U.S. PATENT DOCUMENTS

| 2003/0088698 | A1* | 5/2003 | Singh et al. | 709/239 |
| 2005/0234912 | A1* | 10/2005 | Roach | 707/9 |
| 2006/0230446 | A1* | 10/2006 | Vu | 726/15 |
| 2007/0019568 | A1* | 1/2007 | Velupillai | 370/254 |
| 2009/0129385 | A1* | 5/2009 | Wray et al. | 370/392 |

\* cited by examiner

*Primary Examiner*—Ayaz R Sheikh
*Assistant Examiner*—Nicholas Sloms
(74) *Attorney, Agent, or Firm*—John R. Thompson; Stoel Rives LLP

(57) ABSTRACT

A provider system connects through a virtual private network to a site having various possible virtual private network variants. A virtual private network connection is established to site data management server through a network interface. A virtual machine server, including virtual machines, communicates with the provider system. Each virtual machine is capable of building a virtual private network tunnel connection, over a network, to a site data management server. In establishing a connection, a connection script is executed, a virtual private network is determined, and a virtual private network protocol is executed.

21 Claims, 3 Drawing Sheets

SYSTEM AND METHOD FOR AUTOMATED ACCESS OF A DATA MANAGEMENT SERVER THROUGH A VIRTUAL PRIVATE NETWORK

RELATED APPLICATIONS

This application claims priority to U.S. Patent Application Ser. No. 60/781,117 filed on Mar. 10, 2006 and entitled "Automated DMS Access via VPN" and which is incorporated herein by reference.

TECHNICAL FIELD

This disclosure relates generally to automated access to data management servers.

BRIEF DESCRIPTION OF THE DRAWINGS

Non-limiting and non-exhaustive embodiments of the disclosure are described, including various embodiments of the disclosure with reference to the following Figures.

DETAILED DESCRIPTION

Figure 1:
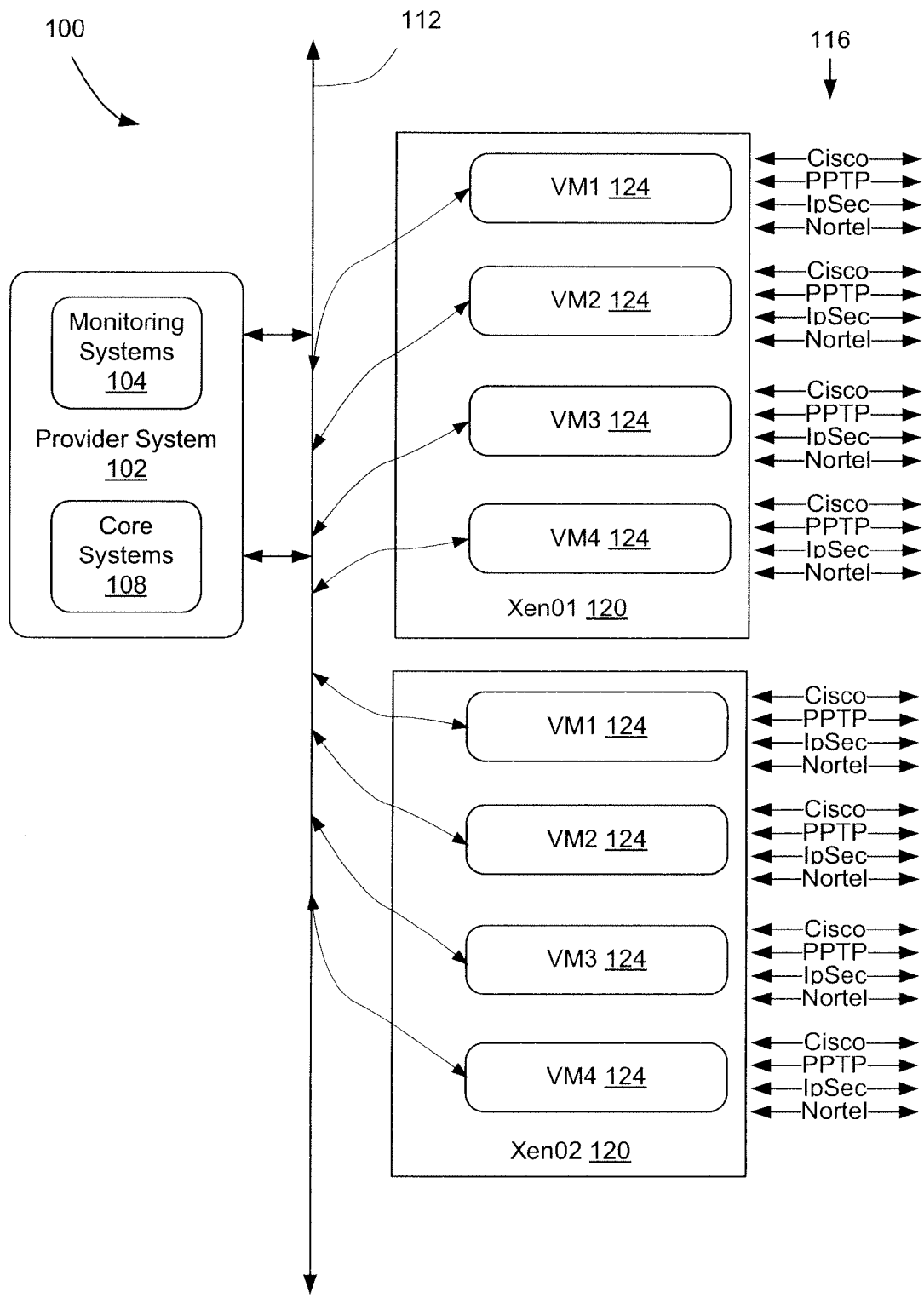
FIG. 1 is a block diagram of an embodiment of an access system.
Figure 2:
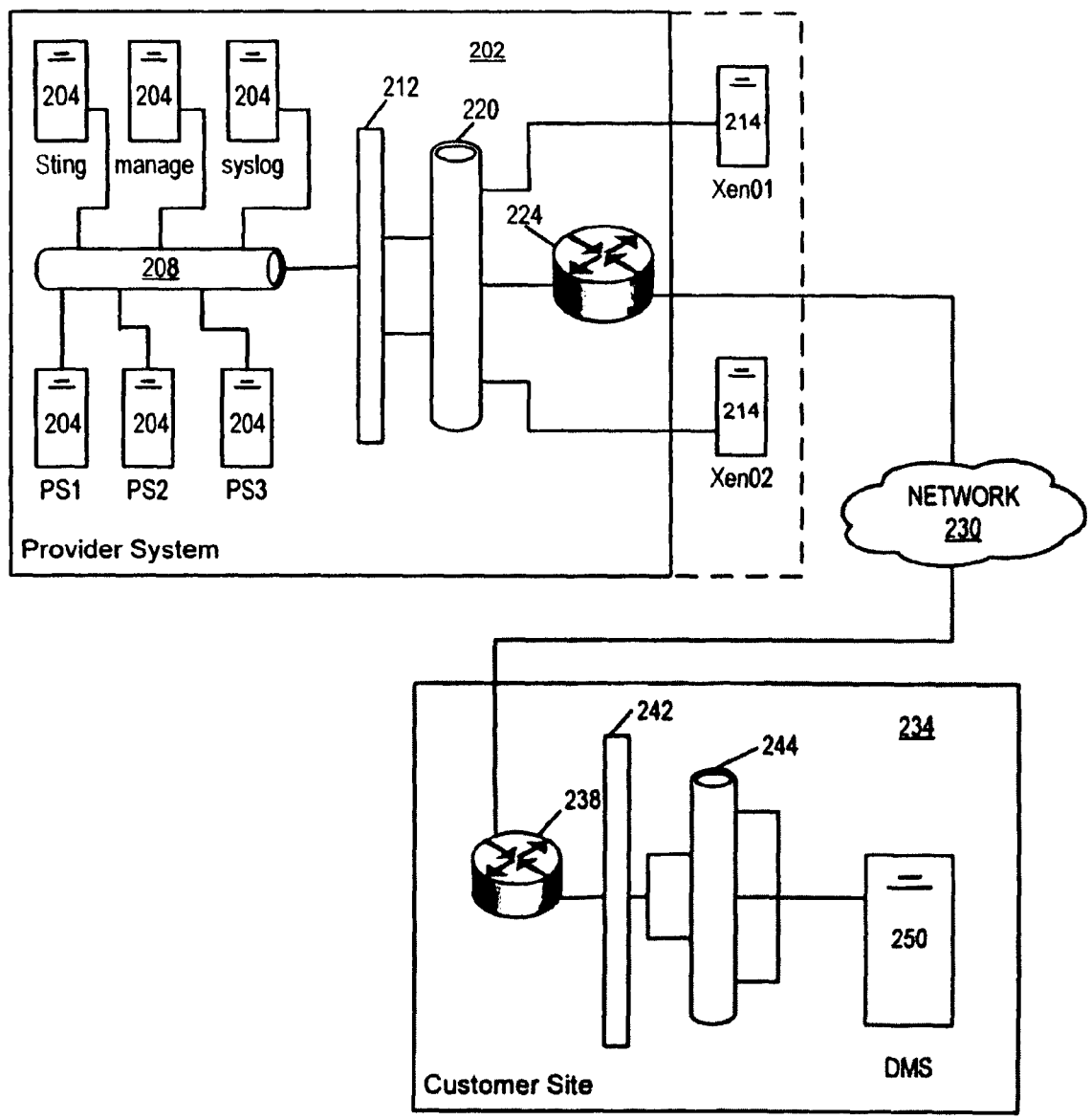
FIG. 2 is a block diagram of an embodiment of an automated access system via a virtual private network.
Figure 3:
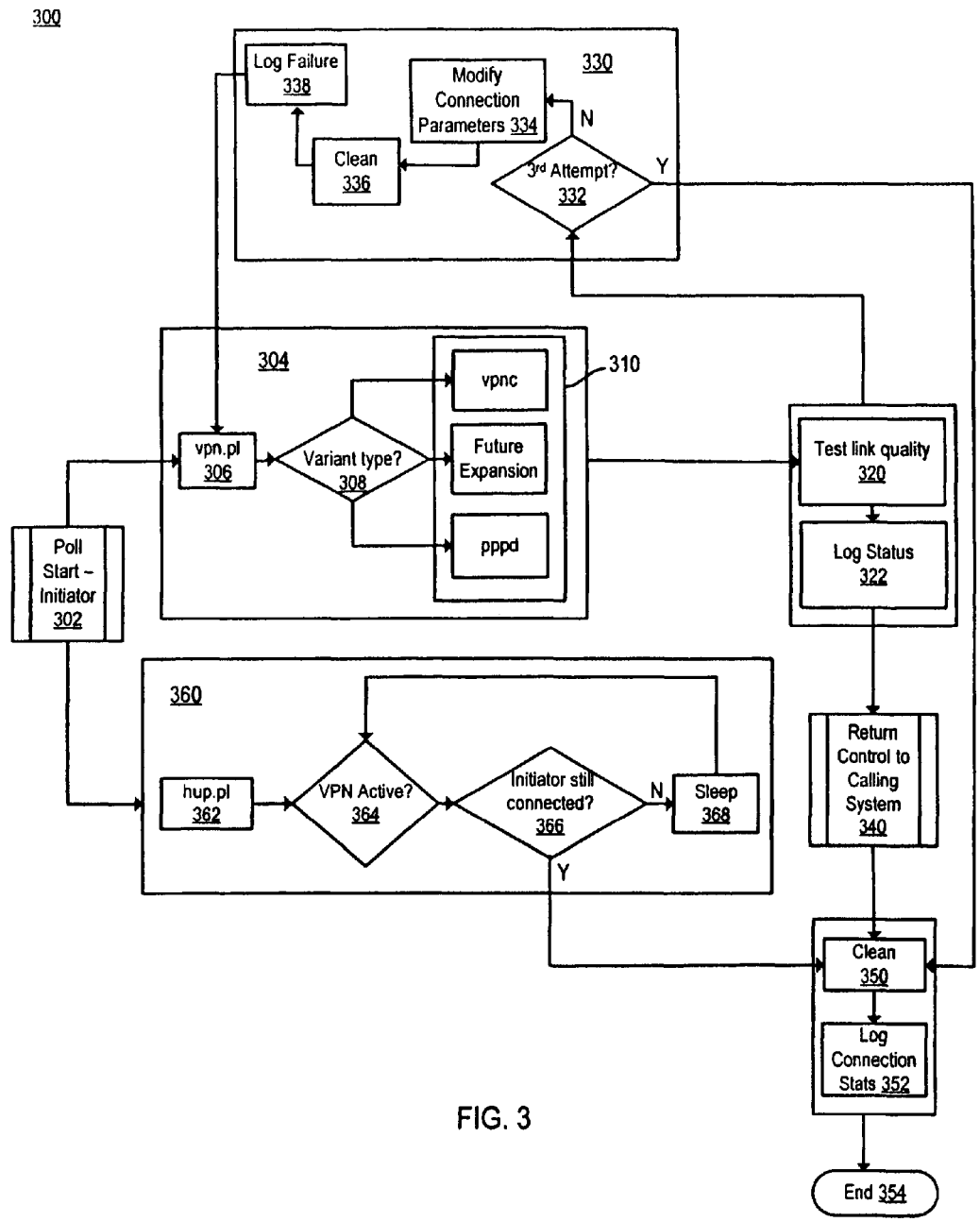
FIG. 3 is a flow chart of a method of accessing a data management server via a virtual private network.

The embodiments of the disclosure will be best understood by reference to the drawings, wherein like parts are designated by like numerals throughout. It will be readily understood that the components of the present invention, as generally described and illustrated in the Figures herein, could be arranged and designed in a wide variety of different configurations. Thus, the following more detailed description of the embodiments of the apparatus, system, and method of the disclosure, as represented in FIGS. 1 through 3, is not intended to limit the scope of the disclosure, as claimed, but is merely representative of possible embodiments of the disclosure.

In some cases, well-known structures, materials, or operations are not shown or described in detail. Furthermore, the described features, structures, or characteristics may be combined in any suitable manner in one or more embodiments. It will also be readily understood that the components of the embodiments as generally described and illustrated in the Figures herein could be arranged and designed in a wide variety of different configurations.

The order of the steps or actions of the methods described in connection with the embodiments disclosed may be changed as would be apparent to those skilled in the art. Thus, any order in the Figures or Detailed Description is for illustrative purposes only and is not meant to imply a required order, unless specified to require an order.

Several aspects of the embodiments described will be illustrated as software modules or components. As used herein, a software module or component may include any type of computer instruction or computer executable code located within a memory device and/or transmitted as electronic signals over a system bus or wired or wireless network. A software module may, for instance, comprise one or more physical or logical blocks of computer instructions, which may be organized as a routine, program, object, component, data structure, etc., that performs one or more tasks or implements particular abstract data types.

In certain embodiments, a particular software module may comprise disparate instructions stored in different locations of a memory device, which together implement the described functionality of the module. Indeed, a module may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices.

FIG. 1 is a block diagram of an access system 100 which displays the basic requirements of accessing a data management server through virtual private networks. A provider system 102, used for data collection, includes one or more monitoring systems 104 to enable providers to support manufacturers and direct-marketing firms (or "entities"). The entities participate in the sales of products which may include goods and affiliated services. Data monitoring and gathering may be in real-time so that providers may provide timely reports and performance audits to the entities. An example of a provider includes IntegraLink, a division of the Cobalt Group, Inc. which monitors the automobile manufacturing industry and, more specifically, the dealerships or direct marketers that sell the manufacturers' automobiles. Thus, a data management server as used herein, may include and also be referring to a "dealership management system."

The provider system 102 tracks data of these, generally corporate, retailers and marketers (hereinafter "customers"). The provider system 102 may include one or more core systems 108 that originate calls to establish virtual private network tunnels through which a provider may electronically communicate with its customers to enable the monitoring discussed above. To connect such calls, a hardware/software interface 112 may be used through which multiple types of connections 116 may be established between core systems 108 and the customers' systems. Providers connect to customers who use a wide variety of virtual private network variants. Thus, the connections 116 include different virtual private network variants.

Current methods of accessing an entity's local area network data management system require a user to actively control the software that establishes a connection to a virtual private network concentrator (not shown) found on the customer side of a virtual private network connection. It is difficult and expensive to scale a one-to-many virtual private network access solution because a physical machine may be required for each connection to a customer's network. Therefore, multiple virtual private network tunnel connections are desired without requiring the same number of hardware devices. One embodiment of the disclosure includes employing one or more host virtual machine servers 120, such as Xen01 and Xen02, each having the capability of running a plurality of virtual machines 124 on top of an operating system of each host virtual machine server 120. Each virtual machine 124, at any given time, may be capable of establishing a virtual private network tunnel with a separate virtual private network concentrator at any given customer site. For instance, two physical virtual machine servers 120 may connect to up to twelve or more data management servers through the use of virtual machines 124.

There is also a need to provide continuing access to the network while the virtual private network is established. A virtual private network client from Cisco®, for example, may disable access to the network for the duration that a virtual private network tunnel is active. This eliminates the ability to have real-time access to the data management server. Current, sub-optimal workarounds involve resorting to non-networked means of communications, such as physically hooking up serial cables to the virtual private network access servers within a provider system 102, or implementing a user datagram protocol based broadcast communications strategy.

The capability to audit performance may vary in data management server access, but most providers require the capability to assess the quality of their systems. For instance, a provider preferably sees past performance for a retailer, a virtual private network virtual machine, different dealer-side virtual private network variants 116, such as Cisco®, Nortel®, point-to-point tunneling protocol, and internet protocol security.

A provider is capable of giving accessible information about the status of a virtual private network connection to assist users utilizing the provider system 102 while troubleshooting failed connections. A provider is also capable of giving the status of resulting failures to users who may be looking at the logs. Further, the provider is able to allow for more verbose and technical output to enable a specialist in virtual private network technologies to further diagnose problems.

The interface 112 to the provider system 102 includes the complexities of the different virtual private network access solutions so that the initiating provider system 102 may continue to operate seamlessly. The provider system 102 may connect using a single interface 112 by calling a script, vpn.pl, and by passing a number of variables in keyname=value pairs, discussed in more detail below. In accordance with a method of the disclosure, the pairs are turned into multiple types of virtual private network connections 116.

Automating the multiple types of virtual private network connections 116 includes the ability to dynamically recover from certain types of failures and modify connection parameters without involvement of the initiating provider system 102. If a connection fails to a concentrator, an ability to retry the connection without involvement of the initiating provider system 102 is enabled. In addition, if the provider system 102 tries to connect to a point-to-point tunneling protocol server, the provider solution may be flexible enough to clean up the call and retry the connection without involvement of the initiating provider system 102. In connecting to a point-to-point tunneling protocol server, by default the provider system 102 may require Microsoft® point-to-point encryption and a Linux server if the provider system 102 does not support Microsoft® point-to-point encryption.

It is also desirable to be able to efficiently plug in new types of virtual private access technologies as they show up at customers' sites. Because of the volume and time constraints of many retailers, it is a requirement that the provider system 102 does not hard fail. No single hardware failure should cause the provider system 102 to crash or fail. No single instance of wrongly configured virtual private network connection parameters should disable the provider system 102. It is also desirable that, in the event of imminent hardware failure, a provider can migrate a virtual private network connection to another more reliable piece of hardware without the involvement of the initiating provider system 102 (referred to as "virtual machine migration").

Referring to FIG. 2, a block diagram is shown of one embodiment of an automated data management server access system 200. The access system 200 provides virtual private network connections and FIG. 2 displays a layout from a system perspective. The provider system 202, as discussed in FIG. 1, may be automated to provide virtual data management server access to provide the above-described requirements. The provider system 202 may include a number of servers 204 which are connected through a first local area network 208. The servers 204 support monitoring systems 104 and core systems 108. The servers 204 may communicate through a firewall 212 to reach customers' systems. The firewall 212 may include network address translation.

On the other side of the firewall 212 may reside one or more virtual machine servers 214, such as Xen01 and Xen02, as referred to in FIG. 1, which may communicate electronically with the provider system 202 through a second local area network 220. The provider system 202 may also include a router 224 which is in electrical communication with the local area network 220. The router 224 may also be embodied as a hub or switch. The router 224 may be in electrical communication with a network 230 which is also in electrical communication with a customer site 234. The network 230 may be the internet, a wide area network, or other type of network. In this manner, the virtual machine servers 214 are in electrical communication with the customer site 234. As can be appreciated by one of skill in the art, the virtual machine servers 214 may be placed in communication with the customer site 234 through a variety of network, routing, and switching options.

The virtual machine servers 214 may be located in a remote location, or at the same site as the provider system 202, such as being located on the same side of the firewall 212 as servers 204. Therefore, FIG. 2 is but one embodiment of several possible implementations.

The customer site 234 may likewise include a router 238 and firewall 242 in its network communication interface. As each customer site 234 may use a different combination of both hardware and software to implement a virtual private network connection interface on the customer side 234, the router 238 and firewall 242 will likely be implemented differently across multiple customers sites 234. The router 238 or the firewall 242 may include a virtual private network concentrator with which the provider system 202 communicates to establish a virtual private network connection tunnel. This virtual private network connection may pass through a customer local area network 244 before linking with the customer's data management server 250.

Referring to both FIGS. 1 and 2, an automated access system 200 may utilize both specially integrated open source software (virtual private network concentrator and point-to-point protocol daemon) and other specially developed proprietary software. That is, a virtual private network concentrator may be used to connect to Cisco®-type access devices and a point-to-point protocol daemon may be used to connect to PPTP-type virtual private network access devices (commonly known as Microsoft® RAS Servers, though they are rarely Microsoft® devices).

The point-to-point protocol daemon software is patched to allow for Microsoft point-to-point encryption (MPPE) inside of the point-to-point tunnel that is established, and an MPPE patch is also applied against a Linux® kernel. A "patch" is special source code file that is derived from the differences between two source files. A programmer adds a feature to a program, then creates a patch that can be applied to the original source file to add the feature again by running a special command. This command will go through and add the programmer's changes to the original source files in the same directory where the command ran. This is a common method for a programmer to inexpensively and rapidly distribute features or software fixes to other users.

Proprietary IntegraLink scripts referred to above may then be used to manage the connections, modify the environment, and log status and other related information. All of the components mentioned here run inside of multiple virtual machines 124 that may reside on a virtual machine server 120/214 which is made possible by hardware virtualization technology. A final software component is an open-source utility called "iptables" that modifies the Linux® kernel's packet filtering rules to control the types of traffice and where traffic is allowed to pass through the Linux® kernel. Providers may use iptables to control network data flow into and out of the virtual machines 124. This enables a provider's internal systems to connect to different ports in order to access all virtual machines 124 operating on a virtual machine server 120, and then connect to a single IP address such as a customer's virtual private network concentrator.

FIG. 3 is a flow chart of an embodiment of a method 300 of automatically accessing a data management server through a virtual private network. The method 300 displays a data path flow of a call to establish a link with a data management server through a virtual private network. A poll start 302 by an initiator of a provider system begins the process. In module 304, an attempt is made to establish a virtual private network connection with a customer site data management server. The module 304 runs core routines to receive arguments from the initiator to establish a virtual private network tunnel. To do so, internal systems of the provider system may connect on a pre-designated server port to one of the host virtual machine servers, which connects the provider system to one of the virtual machines hosted thereon. A virtual machine server may execute 306 a connection script—vpn.pl—and is passed the necessary connection information such as username/password, concentrator IP address, etc., in variables of keyname=value pairs.

A connection script then builds the connection files from the parameters passed to it on the command line. The connection script may require a determination 308 of connection variant type, such as Cisco®, PPTP, IpSec, or Nortel® in aiding a virtual machine in building the virtual private network tunnel. Once the variant type is determined 308, then the virtual private network tunnel may be finally linked through executing the proper software protocol 310, whether it be virtual private network concentrator, PPPD, or a proprietary software designed to run future expansions to potential variant types 116.

After the automated access method 300 executes the binary that will establish the connection, the method 300 also tests 320 the link quality and logs 322 the connection status. The type of quality tests performed may include whether the tunnel is active, whether the remote virtual private network concentrators tunnel side interface is alive, whether the data management server 250 is alive, and whether there is a telnet server responding on the telnet port. The method 300 may also report the connection status back to the calling terminal of the provider's system. If a debugger program (not shown) is activated, much more technical information may be reported back to the calling terminal with which an experienced virtual private network technician could become involved in troubleshooting a call.

If an attempt to link to the customer site data management server 250 fails, a link is tried again after routines in module 330 are executed. Module 330 first determines 332 whether or not the call attempts have reached a certain number. In the given method, three attempts are first made. The module 330 then modifies 334 connection parameters, or variables, as needed before cleaning 336 the connection for another call attempt.

The call failure is logged 338 to keep track of the number of failed attempts, and affiliated errors, before routing the modified connection parameters back to module 304 to attempt another virtual private connection with the customer site data management server, beginning with executing 306 the vpn.pl script again. If a third attempt is reached 332, the virtual machine attempting to initiate a virtual private network connection is cleaned 350 and the connection statistics are logged 352.

Once an attempted connection is established, a connection is made to the customer site data management server through the virtual private network tunnel that is created. At this point, control is returned 340 to the initiating provider system, whereby the initiator begins communicating with the customer site data management server.

After the provider system has completed its data gathering work that required access to the customer site data management server, the system 100 calls a script, such as a vpndisco.pl script, to clean up 350 the virtual machine for the next connection. This script thus brings down the virtual private network tunnel, and also logs 352 connection statistics, ending 354 the call.

Sometimes the initiating provider system fails to execute vpndisco.pl because the initiating provider system scripts reach an error state that the system does not know how to handle. Such error states may arise from network problems between the initiating provider system and the host virtual machine servers or occasional internal virtual machine error states that result in a disconnection of the initiating provider system. Nevertheless, a different log entry is created, the old virtual private network connection is cleaned, and the virtual machine is returned to an idle state. In the idle state, the virtual machine is ready to begin servicing virtual private network requests from the initiator again. In this way, the virtual machine may continue servicing other connections.

At times a more serious error may occur to the initiator itself, which requires running a fail-safe routine and a series of tests performed before cleaning 350 the connection. These occur in module 360, which includes executing 362 script hup.pl, followed by testing 364 whether or not the virtual private network connection is active. Then the provider system determines 366 whether or not the initiator is still connected through the virtual private network connection. If the initiator is not connected, then it may sleep 368 until another connection is attempted. In contrast, if the initiator is still connected, the connection is cleaned 350 as described earlier, and the connection statistics logged 352. All logged statistics and errors of the automated access method 300 may be recorded and later accessed for further possible diagnosis of connection failure issues.

The methods of FIG. 3 and other methods for automating data management server access via virtual private networks, as described herein, may exist in a variety of forms, both active and inactive. For example, they may exist as one or more software or firmware programs comprised of program instructions in source code, object code, executable code or other formats. Any of the above may be embodied on a computer-readable medium, which include storage devices, in compressed or uncompressed form. Exemplary computer-readable storage devices include conventional computer system RAM (random access memory), ROM (read only memory), EPROM (erasable, programmable ROM), EEPROM (electrically erasable, programmable ROM), flash memory and magnetic or optical disks or tapes.

While specific embodiments and applications of the disclosure have been illustrated and described, it is to be understood that the disclosure is not limited to the precise configuration and components disclosed herein. Various modifications, changes, and variations apparent to those of skill in the art may be made in the arrangement, operation, and details of the methods and systems of the disclosure without departing from the spirit and scope of the disclosure.

What is claimed is:

1. An access system for connecting through virtual private networks to sites having a plurality of virtual private network variants, the system comprising:
    a provider system including a core system to establish a virtual private network connection to a site data management server through a network interface; and
    a physical virtual machine server in electrical communication with the provider system, the virtual machine server including a plurality of virtual machines, each virtual machine capable to establish a virtual private network tunnel connection, over a network, to a site data management server, the virtual machine server performing the method of:
        executing a connection script to automatically select one of a plurality of different virtual private network variants, each of the virtual private network variants having an associated protocol, wherein the selection is based on a configuration of the site data management server,
        configuring one of the virtual machines to establish with the site data management server, a virtual private network tunnel of a type corresponding to the selected virtual private network variant and using the associated protocol.

2. The system of claim 1, wherein the virtual machine server further passes a plurality of connection variables.

3. The system of claim 2, wherein the virtual machine server further builds connection files from the connection variables through execution of the virtual private network protocol based on the determined virtual private network variant.

4. The access system of claim 1, wherein the virtual machine server further tests a link quality of the virtual private network connection with the site data management server.

5. The access system of claim 4, wherein the virtual machine server further logs a connection status yielded from testing the link quality.

6. The access system of claim 4, wherein the virtual machine server further performs, in response to a link quality yielding a connection failure:
    automatically running a cleaning script to clean the virtual private network connection;
    logging a connection status; and
    reporting the connection status back to the provider system.

7. The access system of claim 1, wherein the provider system further includes a monitoring system to monitor and gather data from the site data management server.

8. A method of accessing sites through a virtual private network connection with the sites having a plurality of virtual private network variants, comprising:
    initiating a virtual private network connection to a site data management server through a network interface;
    establishing by each virtual machine out of a plurality of virtual machines, a virtual private network tunnel connection, over a network, to the site data management server,
    wherein the plurality of virtual machines are located in a physical virtual machine server in electrical communication with a provider system, and wherein the virtual machine server performs the steps of:
        executing a connection script to automatically without user intervention select one of a plurality of different virtual private network variants, each of the virtual private network variants having an associated protocol, wherein the selection is based on a configuration of the site data management server; and
        configuring one of the virtual machines to establish with the site data management server, a virtual private network tunnel of a type corresponding to the selected virtual private network variant and using the associated protocol.

9. The method of claim 8, wherein executing a connection script includes passing a plurality of connection variables.

10. The method of claim 9, further comprising building connection files from the connection variables through execution of the virtual private network protocol based on the determined virtual private network variant.

11. The method of claim 8, further comprising testing a link quality of the virtual private network connection with the site data management server.

12. The method of claim 11, further comprising logging a connection status yielded from testing the link quality.

13. The method of claim 11, further comprising, in response to a link quality yielding a connection failure:
    automatically without user intervention running a cleaning script to clean the virtual private network connection;
    logging a connection status; and
    reporting the connection status.

14. The method of claim 8, further comprising monitoring and gathering data from the site data management server.

15. A computer readable storage medium having computer readable instruction code for performing a method of accessing sites through a virtual private network connection with the sites having a plurality of virtual private network variants, the method comprising:
    initiating a virtual private network connection to a site data management server through a network interface;
    establishing by each virtual machine out of a plurality of virtual machines, a virtual private network tunnel connection, over a network, to the site data management server,
    wherein the plurality of virtual machines are located in a physical virtual machine server in electrical communication with a provider system, and wherein the virtual machine server performs the steps of:
        executing a connection script to automatically without user intervention select one of a plurality of different virtual private network variants, each of the virtual private network variants having an associated protocol, wherein the selection is based on a configuration of the site data management server; and
        configuring one of the virtual machines to establish with the site data management server, a virtual private network tunnel of a type corresponding to the selected virtual private network variant and using the associated protocol.

16. The computer readable storage medium of claim 15, wherein executing a connection script includes passing a plurality of connection variables.

17. The computer readable storage medium of claim 16, wherein the method further comprises building connection files from the connection variables through execution of the virtual private network protocol based on the determined virtual private network variant.

18. The computer readable storage medium of claim 15, wherein the method further comprises testing a link quality of the virtual private network connection with the site data management server.

19. The computer readable storage medium of claim 18, wherein the method further comprises logging a connection status yielded from testing the link quality.

20. The computer readable storage medium of claim 18, wherein the method further comprises, in response to a link quality yielding a connection failure:
   automatically without user intervention running a cleaning script to clean the virtual private network connection;
   logging a connection status; and
   reporting the connection status.

21. The computer readable storage medium of claim 15, further comprising monitoring and gathering data from the site data management server.

* * * * *